W. H. FARMER.

ELECTRIC SWITCH.

APPLICATION FILED MAR. 15, 1917.

Reissued Oct. 2, 1917. 14,372.

Inventor

William H. Farmer

By Mason Fenwick & Lawrence,

Attorneys

UNITED STATES PATENT OFFICE.

WILLIAM H. FARMER, OF BOOTHBAY HARBOR, MAINE, ASSIGNOR, BY MESNE ASSIGNMENTS, OF ONE-THIRD TO LEWIS A. DUNTON, OF BOOTHBAY HARBOR, MAINE.

ELECTRIC SWITCH.

14,372. Specification of Reissued Letters Patent. Reissued Oct. 2, 1917.

Original No. 1,156,282, dated October 12, 1915, Serial No. 41,361, filed July 22, 1915. Application for reissue filed March 15, 1917. Serial No. 155,110.

*To all whom it may concern:*

Be it known that I, WILLIAM H. FARMER, a citizen of the United States, residing at Boothbay Harbor, in the county of Lincoln and State of Maine, have invented certain new and useful Improvements in Electric Switches; and I do hereby declare the following to be a full, clear, and exact description of the invention, such as will enable others skilled in the art to which it appertains to make and use the same.

This invention relates to new and useful improvements in electric switches, and the object of the invention is to provide a compact and substantial device of this character which is specially adapted for use on any gasolene or naphtha driven engine which operates on batteries, and provides an easy and efficient control for the electric current.

Another object of this invention is to provide a simple and durable device, which is inexpensive to manufacture, and will be very efficient in operation.

A further object of this invention is to provide a simple safety switch in which the closure of the circuit is controlled by a switch plug to be kept by the operator wholly removable at will from the electric circuit by simple withdrawal from a switch block in which is provided a concealed or inclosed pair of spaced contacts having adjacent exposed portions in a recess for the plug.

With these and numerous other objects in view, the invention consists of the novel features of construction, combination and arrangement of parts which will be hereinafter referred to and more particularly pointed out in the specification and claims.

Figure 1:
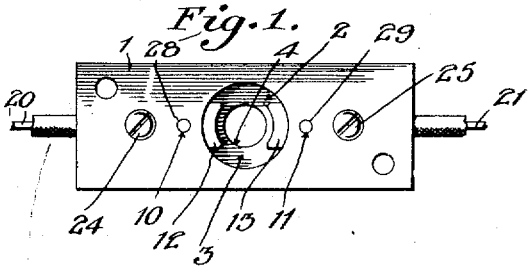
Figure 1 is a plan view of my improved switch with the bridging member removed.
Figure 3:
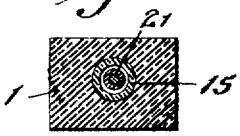
Fig. 3 is a transverse section taken on the line 3—3 of Fig. 4.
Figure 2:
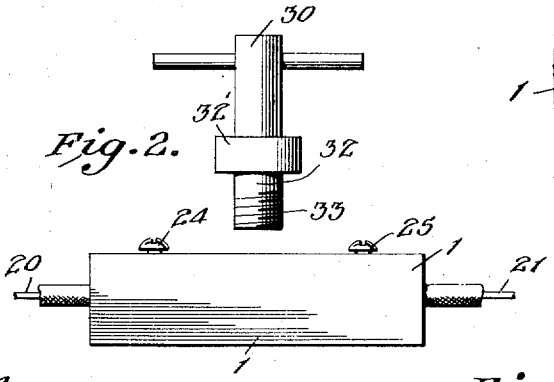
Fig. 2 is an elevation showing the parts in juxtaposition.

In describing my invention, I shall refer to the drawings in which similar reference characters designate corresponding parts throughout the several views, and in which the numeral 1 designates a substantially rectangular-shaped insulator block which may be comprised of any desired insulating material, preferably wood fiber. This insulator block has formed therein a centrally disposed recess 2, which has spaced below the same an integral nut 3 which is formed with screw threads on its inner surface as shown at 4. Projecting radially from the recess 2 in the block 1 are a pair of diametrically opposed longitudinally extending passages 5 which project from said recess through the opposite ends of the block and terminate in outlets 6 and 7 in said ends.

Projecting vertically through the block 1 on opposite sides of the recess therein are apertures 8 and 9 adjacent the outer ends of said block, and apertures 10 and 11 adjacent the recess in the block for a purpose hereinafter to be more fully described.

Positioned in the longitudinally extending passages 5 in the block 1 are a pair of conductors designated by the numerals 12 and 13. These conductors may be formed of any desired material, preferably brass, and are positioned in the said passages 5 in such a manner that their inner ends project within the recess 2 of the block 1, and are spaced relatively from each other as clearly shown in Fig. 4 of the drawings. The outer ends of the said conductors are positioned or embedded in the opposite ends of the insulator blocks and are held therein, spaced from the said ends 6 and 7 of the passages through said blocks, by means of the tubular linings which are designated by the numerals 14 and 15. These tubular linings 14 and 15 will hold the ends of the conductors 12 and 13 spaced from the outer ends of the insulator block, and the said linings are only placed in position after the conductors have been inserted through the ends 6 and 7 of the passage 5, and are placed in the position above described.

The outer ends of the conductors 12 and 13 are formed cone-shaped as shown at 16 and 17, and have formed therein sockets 18 and 19 which are adapted to receive the ends of the wires 20 and 21 which carry the electric current.

Figure 4:
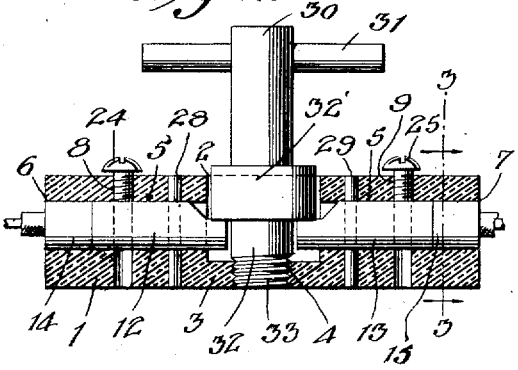
Fig. 4 is a central vertical longitudinal section showing parts of this device in elevation.
Figure 5:
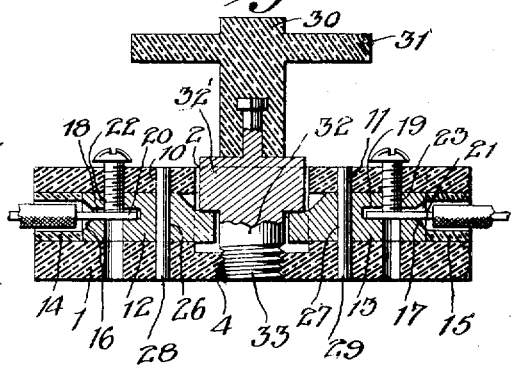
Fig. 5 is a central vertical longitudinal section.

Extending through the ends 16 and 17 of the conductors and alining with the apertures 8 and 9 in the insulator block, are passages 22 and 23 into which are adapted to be positioned locking screws 24 and 25 which are adapted to hold the ends of the wires 20 and 21 in the sockets for said conductors, as clearly shown in Figs. 4 and 5 of the drawings. The conductors are also provided with apertures 26 and 27 which aline with the vertical apertures 10 and 11 in the insulator block, and the said alined apertures are adapted to receive locking pins 28 and 29 which firmly secure the conductors in the passages 5 through the insulator block.

This switch is provided with a readily removable or detachable switch plug or connecting member which is formed of a substantially vertical body portion designated by the numeral 30 which has a cross handle 31 formed on its upper end. This body portion of the movable connecting member is formed of some insulating material, and the lower portion of the said member which is designated by the numeral 32 is formed of brass and has projecting or depending therefrom a screw threaded portion 33 which is adapted to engage the screw threads of the integral nut 3 formed beneath the recess in the insulator block. It will be noted that the connecting member has formed thereon an enlarged portion designated by the numeral 32′ intermediate its ends, and this enlarged portion is adapted to move freely in the recess 2 of the insulator block upon coaction between the threaded portion 33 of the said member and the nut 3 below said recess for a purpose to be hereinafter more fully described.

It will be obvious that when the parts of this device are assembled as shown in Figs. 4 and 5 of the drawings, the current will be fed to one of the conductors through one of the wires which may be designated by the numeral 20, and upon the insertion of the movable member in the recess 2 between the said conductors 5, the contact will be formed therebetween and the circuit will be completed between the wire 20 and the wire 21. This connection is controlled by means of the movable member 30 having its lower end 33 operatively engaging the screw threads 4 on the nut 3 which is positioned below the recess 2 in the insulator block, whereby upon rotation of the said member by means of the handle 31, the enlarged portion 32′ of the said member will be brought into and out of contact with the spaced ends of the conductors which are positioned in the said recess. All that is necessary to operate this switch is to rotate the said member as above described to form a connection between said conductors, and this member will always be in position to make a safe and sure, and water proof contact therebetween.

This switch is adapted to be set up between the batteries and engine, current from the batteries entering the switch on one of the wires as hereinbefore described, and is carried therethrough to the other wire. This switch is operated by simply turning the movable member which is positioned in the recess in said insulating wire which easily and simply makes or breaks the connection between the said wires.

It will be noted that in this switch the ends of the wires go straight in the ends of the insulator block, and are firmly and securely held therein, which is an improvement over devices where the wire has to be wound around a pin or lug whereby they are very liable to annoying breakages. Furthermore, the movable connecting member of this switch is formed in one piece whereby when the engine is not in use, said member may be removed, and thus render the same worthless for further use until it is replaced, which would practically prevent anyone disturbing the engine during temporary absence of the operator.

From the foregoing description of the construction of my improved switch, the manner of applying the same to use, and the operation thereof will be readily understood, and it will be seen that I have provided a simple, inexpensive, and efficient means for carrying out the objects of this invention.

I claim:

1. A switch comprising a one piece insulator block having a centrally disposed recess with a countersunk internally threaded portion therein, said block having a pair of diametrically extending passages from the recess to the ends of the block and a pair of vertically extending passages bisecting each of the first mentioned passages, conductors positioned in the diametrically extending passages projecting in spaced relation in the recess, said conductors having openings therethrough alined with the vertical passages and sockets in their outer ends to receive wires, pins extending through two of said vertical passages to hold said conductors in the block, set screws positioned in the remaining vertical passages to lock the wires in the sockets, and a movable screw member positioned in said recess operatively engaging the countersunk portion of the same and having an enlarged portion for contact with the spaced conductors in the recess.

2. A switch comprising a one piece insulator block having a recess with an internally threaded portion, said block having a pair of diametrically extending passages from the recess to the ends of the block, and a pair of passages perpendicular to and bisecting said first mentioned passages, conductors positioned in the diametrical passages and being in spaced relation in said recess, the conductors having openings alined with the perpendicular passages and sockets in their outer ends to receive wires, set screws threaded in the conductors to lock the wires in the sockets, and a removable screw plug operatively engaging the threads of the recess and having a circuit closing portion for contact with the spaced conductors.

In testimony whereof I affix my signature.

WILLIAM H. FARMER.